US009830824B2

(12) United States Patent
Kim

(10) Patent No.: US 9,830,824 B2
(45) Date of Patent: Nov. 28, 2017

(54) TRAFFIC INFORMATION BIG DATA OPERATION SERVER USING LICENSE PLATE RECOGNITION OF MEANS OF TRANSPORTATION

(71) Applicant: Sung Il Kim, Anyang-si (KR)

(72) Inventor: Sung Il Kim, Anyang-si (KR)

( * ) Notice: Subject to any disclaimer, the term of this patent is extended or adjusted under 35 U.S.C. 154(b) by 0 days.

(21) Appl. No.: 15/491,755

(22) Filed: Apr. 19, 2017

(65) Prior Publication Data

US 2017/0316693 A1   Nov. 2, 2017

(30) Foreign Application Priority Data

Apr. 28, 2016   (KR) .................. 10-2016-0051989

(51) Int. Cl.
| | |
|---|---|
| G08G 1/09 | (2006.01) |
| G08G 1/16 | (2006.01) |
| G08G 1/017 | (2006.01) |
| G08G 1/00 | (2006.01) |
| G08G 1/0967 | (2006.01) |
| G06K 9/00 | (2006.01) |

(52) U.S. Cl.
CPC .......... *G08G 1/164* (2013.01); *G08G 1/0175* (2013.01); *G08G 1/096775* (2013.01); *G08G 1/166* (2013.01); *G08G 1/205* (2013.01); *G06K 9/00825* (2013.01); *G06K 2209/15* (2013.01)

(58) Field of Classification Search
CPC ............... G08G 1/164; G08G 1/0175; G08G 1/096775; G08G 1/166; G08G 1/205; G06K 9/00825; G06K 2209/15

USPC .............................................. 340/905; 703/22
See application file for complete search history.

(56) References Cited

U.S. PATENT DOCUMENTS

2013/0282357 A1*  10/2013  Rubin ...................... G08G 9/02
703/22

FOREIGN PATENT DOCUMENTS

| JP | 2012108084 | 6/2012 |
|---|---|---|
| KR | 1019990041171 | 6/1999 |
| KR | 20070109713 | 11/2007 |
| KR | 20130129503 | 11/2013 |
| KR | 20160035274 | 3/2016 |

* cited by examiner

*Primary Examiner* — Ojiako Nwugo
(74) *Attorney, Agent, or Firm* — IPLA P.A.; James E. Bame

(57) ABSTRACT

A traffic information big data operation server using license plate recognition of means of transportation includes: a transportation information integrating unit which receives an image of a license plate of the transportation means, and transportation information containing acquisition time and acquisition point of the image from a plurality of user terminals, and integrates a identification number, time and location of the transportation means from the transportation information to organize traffic information big data; a target information acquiring unit which receives an identification number of a target transportation means from a control terminal; a target recent location acquiring unit which acquires target time and target location corresponding to the identification number of the target transportation means; an intersection probability calculating unit; and a target current location predicting unit.

7 Claims, 7 Drawing Sheets

TRAFFIC INFORMATION BIG DATA OPERATION SERVER USING LICENSE PLATE RECOGNITION OF MEANS OF TRANSPORTATION

BACKGROUND

The present invention relates to a traffic information big data operation server using license plate recognition of means of transportation. More particularly, the present invention relates to a traffic information big data operation server using license plate recognition of means of transportation, which recognizes a license plate of a vehicle ahead, registers the recognized license plate with a server to organize data, and uses the data to track the vehicle or operates a navigation system using the data.

In general, some drivers find it is hard to recognize that the brake of his or her vehicle breaks down. If the driver drives the vehicle with the brake failed, because the driver cannot let a driver of a vehicle in the rear know that the brake is in operation at the time of sudden braking, it may cause a rear-end collision. As a relevant art, there is Korean Patent Publication No. 10-1999-0041171.

SUMMARY OF THE INVENTION

Accordingly, the present invention has been made in view of the above-mentioned problems occurring in the prior art, and it is an object of the present invention to provide a traffic information big data operation server using license plate recognition of means of transportation, which recognizes a license plate of a vehicle ahead using photographing means, registers the recognized license plate with a server to organize data, and uses the data to track the vehicle or operates a navigation system using the data.

To accomplish the above object, according to the present invention, there is provided a traffic information big data operation server using license plate recognition of means of transportation including: a transportation information integrating unit which receives an image of a license plate of the transportation means, and transportation information containing acquisition time and acquisition point of the image from a plurality of user terminals, and integrates an identification number, time and location of the transportation means from the transportation information to organize traffic information big data; a target information acquiring unit which receives an identification number of a target transportation means from a control terminal; a target recent location acquiring unit which acquires target time and target location corresponding to the identification number of the target transportation means; an intersection probability calculating unit which calculates reachable routes of the target transportation means from the target time to the current time, detects intersections located on the reachable routes, and calculates probabilities to branch off at each of the intersections; and a target current location predicting unit which multiplies the probabilities in each reachable route, predicts the current location of the target transportation means based on the multiplication result, and transmits the predicted result to the control terminal.

In another embodiment of the present invention, there is provided an user terminal for traffic information big data operation including: an image acquiring unit for acquiring an image from photographing means disposed on a first transportation means; a transportation information acquiring unit which analyzes the image to recognize a license plate of a second transportation means different from the first transportation means, and acquires the acquisition time and acquisition point of the image as transportation information of the second transportation means; and a notification message transmitting unit which transmits a notification message containing the transportation information to the traffic information big data operation server.

In a further embodiment of the present invention, there is provided a traffic information big data operation system using license plate recognition of means of transportation including: at least one user terminal which acquires an image from photographing means disposed on a first transportation means, analyzes the image to recognize a license plate of a second transportation means different from the first transportation means, acquires the acquisition time and acquisition point of the image as transportation information of the second transportation means, and transmits a notification message containing the transportation information; at least one control terminal which is capable of transmitting an identification number of the second transportation means different from the first transportation means; and a traffic information big data operation server which receives an image of a license plate of a transportation means and transportation information containing acquisition time and acquisition point of the image from a plurality of user terminals, integrates the identification number, time and location of the transportation means from the transportation information to organize traffic information big data, receives an identification number of a target transportation means from a control terminal, acquires target time and target location corresponding to the identification number of the target transportation means, calculates reachable routes of the target transportation means from the target time to the current time, detects intersections located on the reachable routes, calculates probabilities to branch off at each of the intersections, multiplies the probabilities in each reachable route, predicts the current location of the target transportation means based on the multiplication result, and transmits the predicted result to the control terminal.

In a further embodiment of the present invention, there is provided a method of operating traffic information big data using license plate recognition of means of transportation including the steps of: organizing traffic information big data by receiving an image of a license plate of a transportation means and transportation information containing acquisition time and acquisition point of the image from a plurality of user terminals and integrating the identification number, time and location of the transportation means from the transportation information to organize traffic information big data; receiving an identification number of a target transportation means from a control terminal; acquiring target time and target location corresponding to the identification number of the target transportation means; calculating reachable routes of the target transportation means from the target time to the current time, detecting intersections located on the reachable routes and calculating probabilities to branch off at each of the intersections; multiplying the probabilities in each reachable route, predicting the current location of the target transportation means based on the multiplication result and transmitting the predicted result to the control terminal.

As described above, according to a preferred embodiment of the present invention, the traffic information big data operation server using license plate recognition of means of transportation may recognize a license plate of a vehicle ahead using photographing means, register the recognized license plate with a server to organize data, and use the data to track the vehicle or operate a navigation system using the data.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
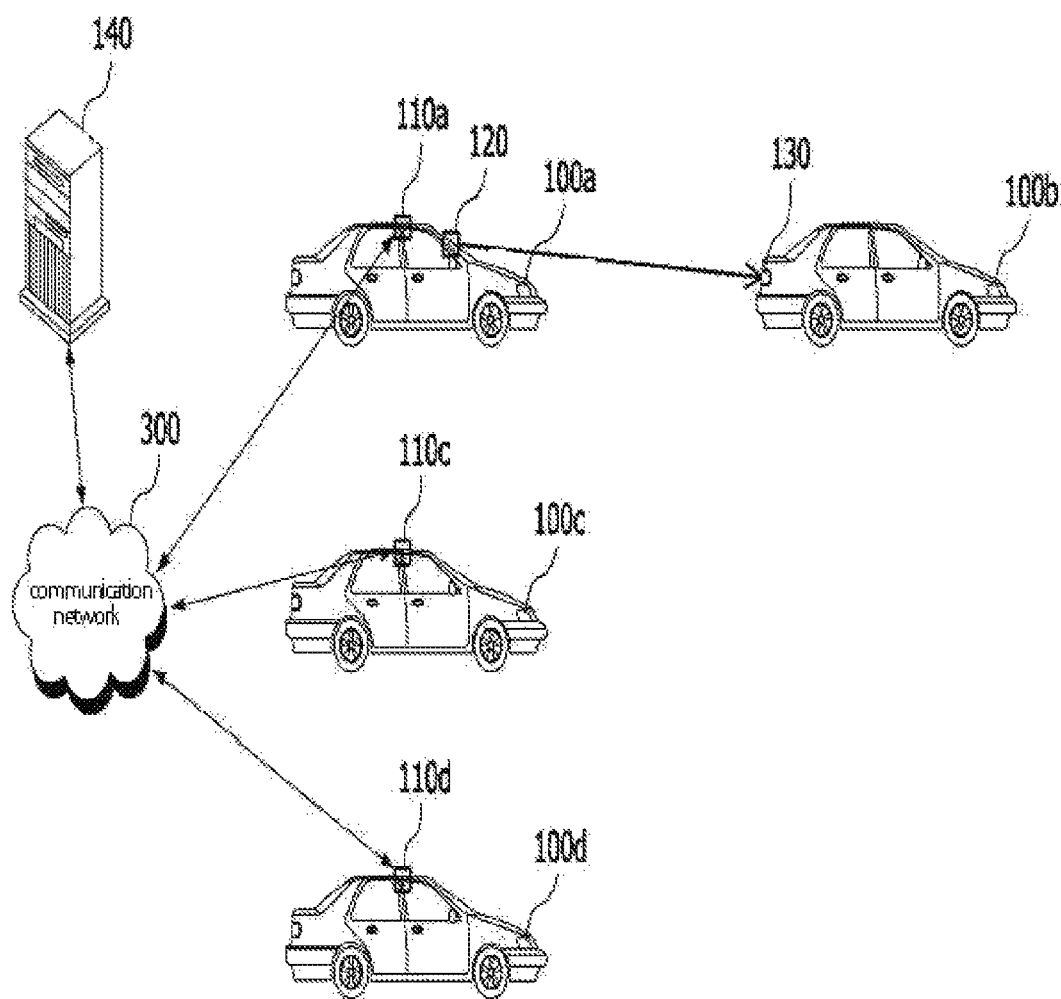
FIG. 1 is a view showing configuration of a traffic information big data operation system using license plate recognition of means of transportation according to a preferred embodiment of the present invention.

As the present invention allows for various changes and numerous embodiments, particular embodiments will be illustrated in the drawings and described in detail in the written description.

However, this is not intended to limit the present invention to particular modes of practice, and it is to be appreciated that all changes, equivalents, and substitutes that do not depart from the spirit and technical scope of the present invention are encompassed in the present invention. In the attached drawings, similar components have similar reference numerals even though they are illustrated in different figures.

When a component is said to be "connected to" or "accessing" another component, it is to be appreciated that the two components can be directly connected to or directly accessing each other but can also include one or more other components in-between.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Hereinafter, preferred embodiments of the present invention will be described with reference to the accompanying drawings. Also, in description of the present invention referring to the accompanying drawings, those components that are the same or are in correspondence are rendered the same reference numeral, and redundant descriptions are omitted.

Organization of Big Data Through License Plate Recognition

FIG. 1 is a view showing configuration of a traffic information big data operation system using license plate recognition of means of transportation according to a preferred embodiment of the present invention.

Referring to FIG. 1, the traffic information big data operation system using license plate recognition of the means of transportation according to the preferred embodiment of the present invention includes photographing means 120 disposed on the transportation means 100a. When the photographing means 120 disposed on the transportation means 100a transmits an image, which captured a license plate 130 of another transportation means 100b, to a user terminal 110a inside the transportation means 100a, the user terminal 110a may transmit a notification message to a big data operation server 140 through a communication network 300.

In FIG. 1, cars are illustrated as the transportation means 100a, 100b, 100c and 100d, but the present invention is not restricted to the above and all kinds of transportation means having license plates may be adopted.

The photographing means 120 and the user terminal 110a may be connected with each other electrically or via wireless communication.

The photographing means 120, for instance, may be a black box disposed in the transportation means 110a.

The user terminals 100a, 100c and 100d means communication terminals which can receive the image from the photographing means 120 and transmit a notification message containing the current time and location to the big data operation server 140. Here, the user terminals 100a, 100c and 100d may be drivers' portable terminals.

In the meantime, the communication network 300 plays a role to connect the user terminals 100a, 100c and 100d to the big data operation server 140. For instance, the communication network 300 may include wired networks, such as local area networks (LANs), wide area networks (WANs), metropolitan area networks (MANs), and integrated service digital networks (ISDNs), or various kinds of wireless networks, such as wireless LANs, CDMA, Bluetooth, and satellite communications, but the scope of the present invention is not limited to the above.

Figure 2:
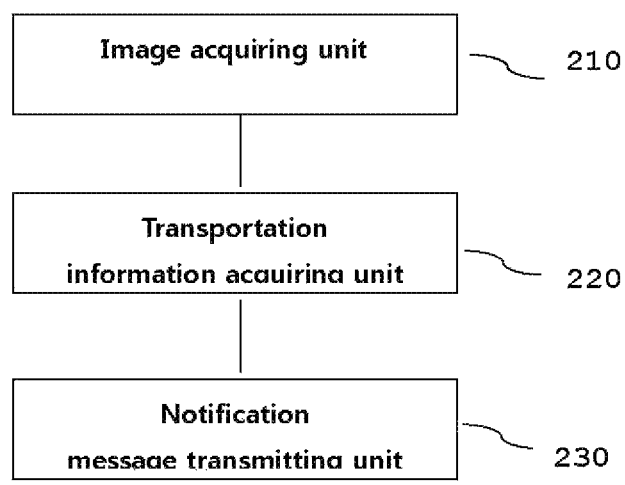
FIG. 2 is a block diagram showing an example of an inside configuration of a user terminal for operation of traffic information big data shown in FIG. 1.

FIG. 2 is a block diagram showing an example of an inside configuration of the user terminal 110a for operation of traffic information big data shown in FIG. 1.

Referring to FIG. 2, the user terminal 110a for operation of traffic information big data illustrated in FIG. 1 includes an image acquiring unit 210, a transportation information acquiring unit 220, and a notification message transmitting unit 230.

The image acquiring unit 210 acquires an image from the photographing means disposed on the transportation means.

The transportation information acquiring unit 220 analyzes the image to recognize a license plate of a second transportation means different from a first transportation means, and then, acquires acquisition time and acquisition point of the image as transportation information of the second transportation means.

The notification message transmitting unit 230 transmits a notification message containing transportation information to the traffic information big data operation server.

Figure 3:
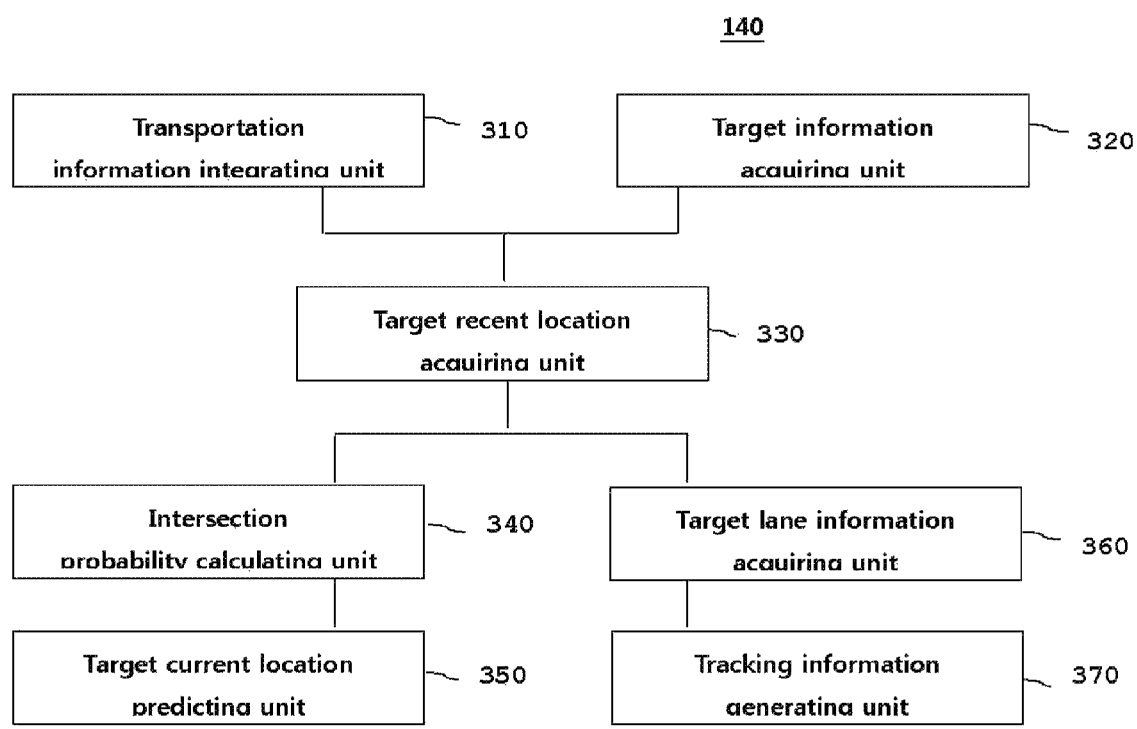
FIG. 3 is a block diagram showing an example of an inside configuration of a traffic information big data operation server shown in FIG. 1.

FIG. 3 is a block diagram showing an example of an inside configuration of a traffic information big data operation server shown in FIG. 1.

Referring to FIG. 3, the traffic information big data operation server 140 illustrated in FIG. 1 may include a transportation information integrating unit 310 in order to organize big data through license plate recognition.

The transportation information integrating unit 310 receives the image of the license plate of the transportation means and the transportation information containing the acquisition time and acquisition point of the image from each of the user terminals, and integrates an identification number, time and location of the transportation means from the transportation information in real time to organize traffic information big data.

In an embodiment, the transportation information integrating unit 310 can acquire images of other transportation means within a predetermined first range from a predicted point in real time while predicting the current location of a target transportation means in real time.

In an embodiment, if there is no other transportation means within the predetermined first range from the predicted point, the transportation information integrating unit 310 may expand the first range to a second range, and then, provide a route to pass the first range relative to other transportation means within the second range.

Figure 4:
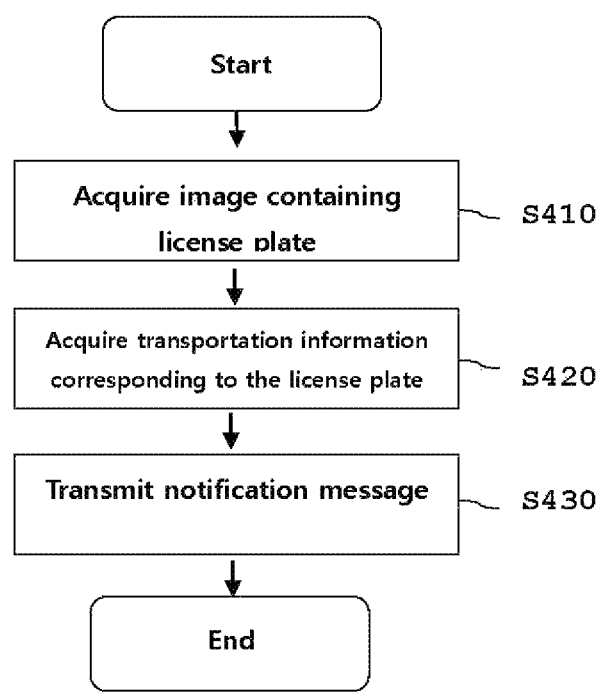
FIG. 4 is an operational flow chart showing a method of operating traffic information big data using license plate recognition of means of transportation according to a first preferred embodiment of the present invention.

FIG. 4 is an operational flow chart showing a method of operating traffic information big data using license plate recognition of means of transportation according to a first preferred embodiment of the present invention.

Referring to FIG. 4, a method of operating traffic information big data using license plate recognition of means of transportation according to the preferred embodiment of the present invention includes (S410) acquiring an image from photographing means disposed on the transportation means by an image acquiring unit (see 210 in FIG. 2).

Moreover, the method of operating traffic information big data using license plate recognition of means of transportation according to the preferred embodiment of the present invention includes, by a transportation information acquiring unit (see 220 in FIG. 2), (S420) analyzing the image to recognize a license plate of a second transportation means different from a first transportation means and acquiring acquisition time and acquisition point of the image as transportation information of the second transportation means.

Furthermore, the method of operating traffic information big data using license plate recognition of means of transportation according to the preferred embodiment of the present invention further includes, by a notification message transmitting unit (see 230 in FIG. 2), (S430) transmitting a notification message containing transportation information to the traffic information big data operation server.

Vehicle Tracking & Navigation Operation

Referring to FIG. 3, in relation with vehicle tracking and navigation operation, the traffic information big data operation server 140 illustrated in FIG. 1 may further include a target information acquiring unit 320 for vehicle tracking and navigation operation, a target current location acquiring unit 330, an intersection probability calculating unit 340, a target current location predicting unit 350, a target lane information acquiring unit 360, and a tracking information generating unit 370.

The target information acquiring unit 320 receives an identification number of a target transportation means from a control terminal.

The target current location acquiring unit 330 acquires target time and target location corresponding to the identification number of the target transportation means.

The intersection probability calculating unit 340 calculates a route that the target transportation means is reachable from the target time to the current time, detects intersections located on the reachable route, and calculates probability to branch off at the intersections.

In an embodiment, the intersection probability calculating unit 340 may re-calculate probability to branch off at each of the intersections using driving lane information of the target transportation means.

The target current location predicting unit 350 multiplies the probabilities in each reachable route, predicts the current location of the target transportation means based on the multiplication result, and transmits the predicted result to the control terminal.

If a difference between the target time and the current time is within a range of a predetermined time, the target lane information acquiring unit 360 additionally acquires lane information of the transportation means acquiring the image of the target transportation means to acquire lane information of the target transportation means.

As described above, according to an embodiment of the present invention, even though GPS information of the target transportation means is acquired, in fact, it is difficult to obtain the lane information of the target transportation means. Therefore, the target lane information acquiring unit 360 may calculate the lane information by analyzing a relative location and others based on at least two kinds of GPS information, such as GPS information of the image-captured transportation means.

The tracking information generating unit 370 receives the identification number and location of the tracking transportation means, generates a tracking route in order to make the tracking transportation means and the target transportation means meet together, and transmits the tracking information containing the tracking route and a predicted meeting point to the control terminal and the tracking transportation means in real time.

In an embodiment, in case that there are a plurality of tracking transportation means, the tracking information generating unit 370 sets priorities to a plurality of reachable routes of the tracking transportation means, generates predicted meeting points to the number of the tracking transportation means in order of higher priority, and then, gives different predicted meeting points to the tracking transportation means.

As described above, according to the embodiment of the present invention, in the case that there are a plurality of the tracking transportation means, scenarios on where the target transportation means moves are configured depending on the intersection probability, and then, the tracking transportation means are respectively assigned to the scenarios, so that the traffic information big data operation server can track the target transportation means more effectively.

Figure 5:
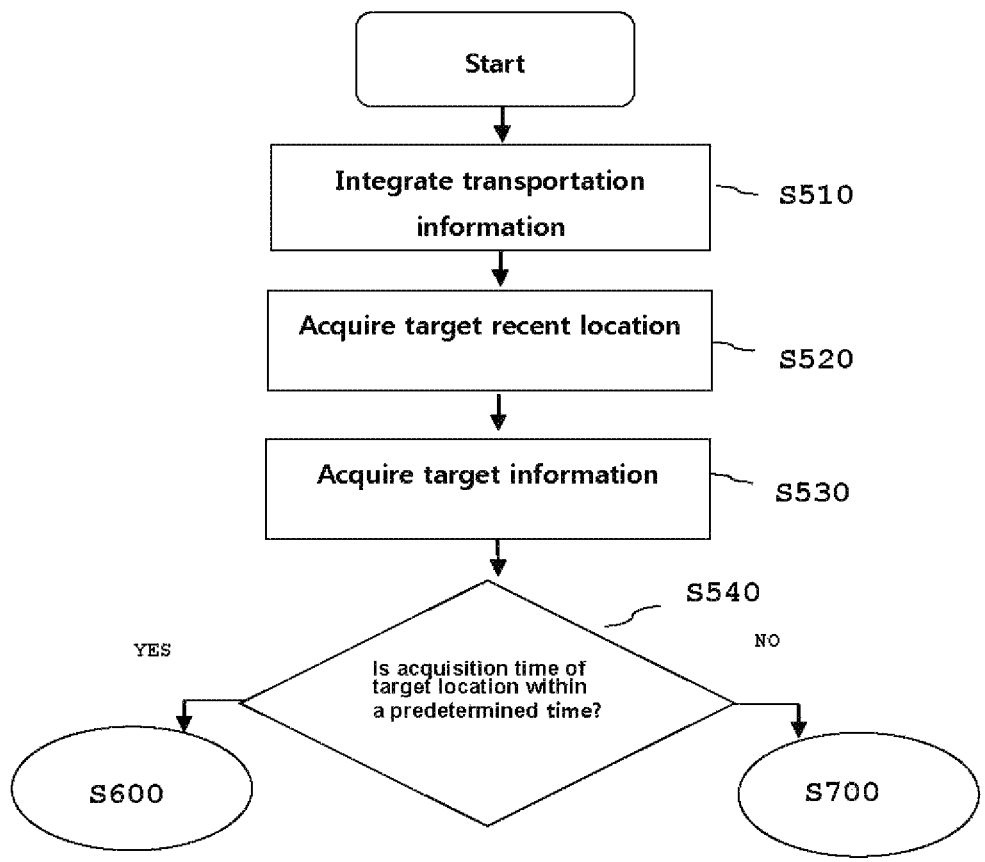
FIG. 5 is an operational flow chart showing a method of operating traffic information big data using license plate recognition of means of transportation according to a second preferred embodiment of the present invention.

FIG. 5 is an operational flow chart showing a method of operating traffic information big data using license plate recognition of means of transportation according to a second preferred embodiment of the present invention.

Referring to FIG. 5, the method of operating traffic information big data using license plate recognition of means of transportation according to the second preferred embodiment of the present invention includes (S510) integrating transportation information received from the user terminal.

Moreover, the method of operating traffic information big data using license plate recognition of means of transportation according to the second preferred embodiment of the present invention includes (S520) acquiring information of a target transportation means from the control terminal.

Furthermore, the method of operating traffic information big data using license plate recognition of means of transportation according to the second preferred embodiment of the present invention includes (S530) acquiring the recent location of the target transportation means.

Additionally, the method of operating traffic information big data using license plate recognition of means of transportation according to the second preferred embodiment of the present invention includes (S540) deciding whether the acquisition time of the target location is within a predetermined time.

Figure 6:
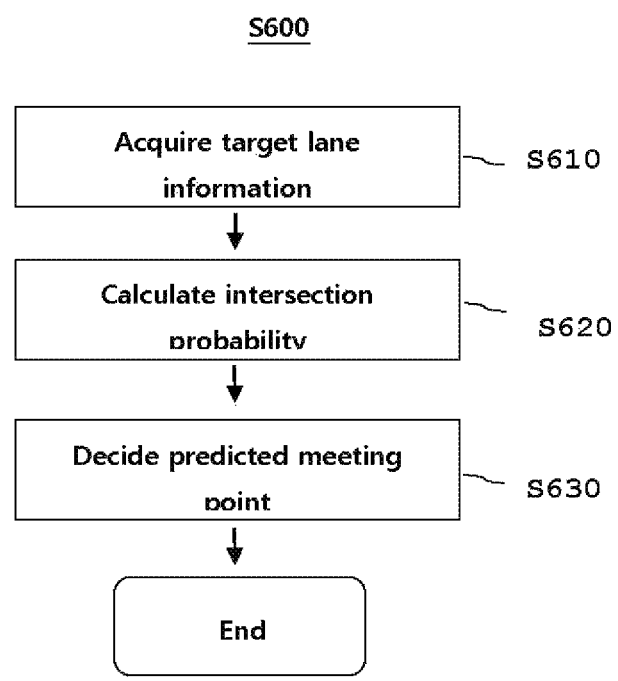
FIG. 6 is an operational flow chart showing a method of operating traffic information big data using license plate recognition of means of transportation according to a third preferred embodiment of the present invention.

In the step (S540), if the acquisition time of the target location is within a predetermined time, the traffic information big data operation server decides that the target transportation means is traceable in real time, and proceeds the process illustrated in FIG. 6. If the acquisition time of the target location is not within a predetermined time, the traffic information big data operation server decides that the target transportation means is not traceable in real time, and proceeds the process illustrated in FIG. 7.

FIG. 6 is an operational flow chart showing a method of operating traffic information big data using license plate recognition of means of transportation according to a third preferred embodiment of the present invention.

Referring to FIG. 6, the method of operating traffic information big data using license plate recognition of means of transportation according to the third preferred embodiment of the present invention includes (S610) acquiring lane information of a target transportation means if the acquisition time of the target location is within a predetermined time.

Moreover, the method of operating traffic information big data using license plate recognition of means of transportation according to the third preferred embodiment of the present invention includes (S620) recalculating intersection probability using the lane information of the target transportation means.

Furthermore, the method of operating traffic information big data using license plate recognition of means of transportation according to the third preferred embodiment of the present invention includes (S630) deciding a predicted meeting point between the tracking transportation means and the target transportation means on the basis of the recalculated intersection probability.

Figure 7:
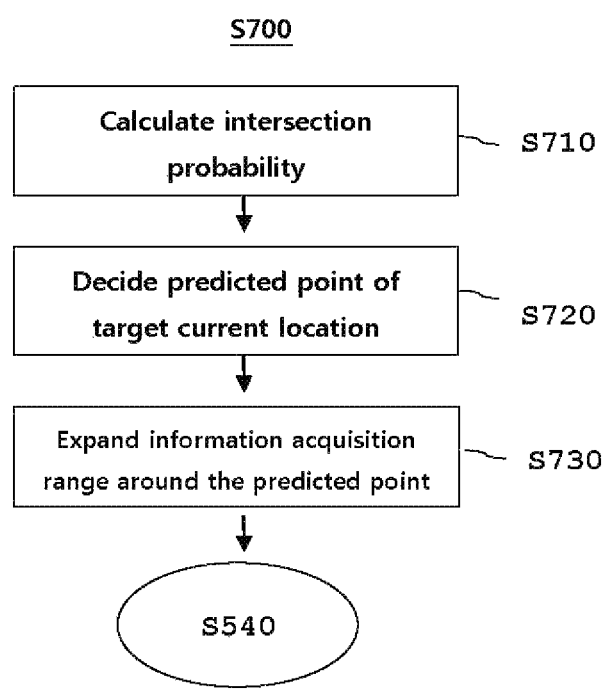
FIG. 7 is an operational flow chart showing a method of operating traffic information big data using license plate recognition of means of transportation according to a fourth preferred embodiment of the present invention.

FIG. 7 is an operational flow chart showing a method of operating traffic information big data using license plate recognition of means of transportation according to a fourth preferred embodiment of the present invention.

Referring to FIG. 7, the method of operating traffic information big data using license plate recognition of means of transportation according to the fourth preferred embodiment of the present invention includes (S710), if the acquisition time of the target location is not within a predetermined time, calculating reachable routes of a target transportation means based on the time elapsed from the recent target location, and carrying out probability calculation relative to intersections on reachable routes.

Additionally, the method of operating traffic information big data using license plate recognition of means of transportation according to the fourth preferred embodiment of the present invention includes (S720) deciding a point predicted as the current location of the target transportation means on the basis of a result that probabilities of the reachable routes are multiplied.

In addition, the method of operating traffic information big data using license plate recognition of means of transportation according to the fourth preferred embodiment of the present invention includes (S730) expanding an information acquisition range in order to acquire information around a point that is predicted as the current location of the target transportation means.

After the information acquisition range is expanded through the step (S730), when an image of the target transportation means is acquired, the traffic information big data operation server decides that the target transportation means is traceable in real time, and proceeds the process illustrated in FIG. 6.

Notification of Breakdown of Brake Lamp

In case of a big data operation system according to another embodiment of the present invention, when the photographing means disposed in the transportation means transmits an image of a brake of another transportation means to the big data operation server disposed in the transportation means, the big data operation server decides whether or not the brake has broken down. When it is decided that the brake has broken down, a notification message may be transmitted to the big data operation server disposed in the transportation means.

A brake lamp is a lamp disposed at the rear of the transportation means, and includes two main lamps arranged symmetrically at the right and the left and may selectively include an auxiliary lamp arranged in the middle.

The big data operation server for breakdown notification of the brake lamp includes an image acquiring unit (not shown), a brake lamp breakdown deciding unit (not shown), and a notification message transmitting unit (not shown).

The image acquiring unit (not shown) acquires an image from the photographing means disposed in the transportation means.

In an embodiment, the image acquiring unit (not shown) decides whether the brake of the transportation means is operated or not, and then, when the brake of the transportation means is in operation, can acquire the image.

In an embodiment, if the brake of the transportation means is in operation, the image acquiring unit (not shown) further decides whether a distance between the transportation means and a target transportation means is within a predetermined standard distance or not, and then, when the distance is within the standard distance, can acquire the image.

In an embodiment, when the distance is within the standard distance, the image acquiring unit (not shown) further decides whether the transportation means is in stop, and then, when the transportation means is in stop, can acquire the image.

The brake lamp breakdown deciding unit (not shown) analyzes the image, and then, decides whether the brake lamps of the target transportation means have broken down or not.

In an embodiment, the brake lamp breakdown deciding unit (not shown) may decide that the brake lamp of the target transportation means has broken down if just one of the lamps of the target transportation means in the image flickers.

In an embodiment, the brake lamp breakdown deciding unit (not shown) may decide that the brake lamp of the target transportation means has broken down if no one of the lamps of the target transportation means in the image flickers.

In an embodiment, the brake lamp breakdown deciding unit (not shown) detects lanes in the image, and recognizes lamps, which are within an area corresponding to two lanes corresponding to the transportation means, as lamps of the target transportation means.

In an embodiment, the brake lamp breakdown deciding unit (not shown) analyzes the image to recognize a license plate of the target transportation means.

In an embodiment, the brake lamp breakdown deciding unit (not shown) analyzes the image, and when the lamps flicker asymmetrically based on the license plate, may decide that the brake lamps has broken down.

When it is decided that the brake lamps has broken down, the notification message transmitting unit (not shown) may transmit a notification message for notifying breakdown of the brake lamp to the user terminal in the target transportation means using the user terminal inside the transportation means.

In an embodiment, the notification message transmitting unit (not shown) may send a notification message for notifying breakdown of the target transportation means corresponding to the license plate to other transportation means around the target transportation means using the user terminal inside the transportation means.

In an embodiment, the notification message transmitting unit (not shown) may send the notification message for notifying breakdown of the target transportation means corresponding to the license plate to other transportation means around the target transportation means only when an ACK (acknowledgement) message corresponding to the notification message is not received from the user terminal inside the target transportation means.

The above descriptions provide a best mode of the invention and provide examples to describe the invention for those skilled in the art to manufacture and use the invention. In this specification, the invention is not limited to proposed specific terms.

Therefore, while the invention has been described in detail with reference to the above-described examples, it should be understood by those skilled in the art that various changes, modifications, and alternations may be made without departing from the spirit and scope of the invention. To sum up, it should be also understood that it is not necessary to include all functional blocks illustrated in the drawings or to follow all sequences illustrated in the drawings as the sequences illustrated in order to achieve the effects intended by the present invention, and it should be also understood that all technical ideas within the equivalent scope belong to the technical scope of the present invention described in claims.

What is claimed is:

1. A traffic information big data operation server using license plate recognition of means of transportation comprising:
   a transportation information integrating unit which receives an image of a license plate of means of transportation, and transportation information containing acquisition time and acquisition point of the image from a plurality of user terminals, and integrates an identification number, time and location of the transportation means from the transportation information to organize traffic information big data;
   a target information acquiring unit which receives an identification number of a target transportation means from a control terminal;
   a target recent location acquiring unit which acquires target time and target location corresponding to the identification number of the target transportation means;
   an intersection probability calculating unit which calculates reachable routes of the target transportation means from the target time to the current time, detects intersections located on the reachable routes, and calculates probabilities to branch off at each of the intersections;
   a target current location predicting unit which multiplies the probabilities in each reachable route, predicts the current location of the target transportation means based on the multiplication result, and transmits the predicted result to the control terminal;
   a brake lamp breakdown deciding unit which analyzes the image to decide whether brake lamps of the target transportation means have broken down or not, decides that the brake lamps of the target transportation means have broken down if just one of the lamps of the target transportation means in the image flickers, decides that the brake lamps of the target transportation means have broken down if no one of the lamps of the target transportation means in the image flicker, and detects lanes in the image to recognize lamps, which are within an area corresponding to two lanes corresponding to the transportation means, as lamps of the target transportation means; and
   a notification message transmitting unit which transmits a notification message for notifying breakdown of the brake lamps to user terminals of other transportation means using a user terminal inside the transportation means if it is decided that the brake lamps have broken down.

2. The traffic information big data operation server according to claim 1, further comprising:
   a target lane information acquiring unit which additionally acquires lane information of the transportation means acquiring the image of the target transportation means to acquire lane information of the target transportation means, if a difference between the target time and the current time is within a range of a predetermined time.

3. The traffic information big data operation server according to claim 2, wherein the intersection probability calculating unit recalculates probability to branch off at each of the intersections using the lane information of the target transportation means.

4. The traffic information big data operation server according to claim 3, further comprising:
   a tracking information generating unit which receives the identification number and the location of the tracking transportation means, generates a tracking route in order to make the tracking transportation means and the target transportation means meet together, and transmits the tracking information containing the tracking route and a predicted meeting point to the control terminal and the tracking transportation means in real time.

5. The traffic information big data operation server according to claim 4, wherein in case that there are a plurality of tracking transportation means, the tracking information generating unit sets priorities to a plurality of the reachable routes of the tracking transportation means, generates predicted meeting points to the number of the tracking transportation means in order of higher priority, and then, gives different predicted meeting points to the tracking transportation means.

6. The traffic information big data operation server according to claim 2, wherein the transportation information integrating unit acquires images of other transportation means within a predetermined first range from a predicted point in real time while predicting the current location of the target transportation means in real time.

7. The traffic information big data operation server according to claim 6, wherein if there is no other transportation means within the predetermined first range from the predicted point, the transportation information integrating unit expands the first range to a second range, and provides a route to pass the first range relative to other transportation means within the second range.

* * * * *